US011711491B2

(12) United States Patent
Zhu et al.

(10) Patent No.: US 11,711,491 B2
(45) Date of Patent: Jul. 25, 2023

(54) VIDEO IMAGE DE-INTERLACING METHOD AND VIDEO IMAGE DE-INTERLACING DEVICE

(71) Applicant: BOE Technology Group Co., Ltd., Beijing (CN)

(72) Inventors: Dan Zhu, Beijing (CN); Ran Duan, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 8 days.

(21) Appl. No.: 17/625,714

(22) PCT Filed: Mar. 2, 2021

(86) PCT No.: PCT/CN2021/078598
§ 371 (c)(1),
(2) Date: Jan. 7, 2022

(87) PCT Pub. No.: WO2022/183358
PCT Pub. Date: Sep. 9, 2022

(65) Prior Publication Data
US 2023/0156147 A1 May 18, 2023

(51) Int. Cl.
*H04N 7/01* (2006.01)
(52) U.S. Cl.
CPC ............ *H04N 7/012* (2013.01); *H04N 7/0102* (2013.01)
(58) Field of Classification Search
CPC ......... H04N 7/012; H04N 7/01; H04N 7/0102
USPC .......................... 348/441, 448, 446, 458, 459
See application file for complete search history.

(56) References Cited

U.S. PATENT DOCUMENTS

| 2008/0055462 | A1 | 3/2008 | Garg et al. |
| 2008/0174694 | A1* | 7/2008 | Morad ................ H04N 7/0142 348/E7.003 |
| 2009/0086816 | A1 | 4/2009 | Leontaris et al. |
| 2010/0177241 | A1 | 7/2010 | Chen et al. |

(Continued)

FOREIGN PATENT DOCUMENTS

| CN | 101827206 A | 9/2010 |
| CN | 101855910 A | 10/2010 |

(Continued)

OTHER PUBLICATIONS

Resample and Interpolate time series data, https://kanoki.org/2020/04/14/resample-and-interpolate-time-series-data/.

(Continued)

*Primary Examiner* — Sherrie Hsia
(74) *Attorney, Agent, or Firm* — Intellectual Valley Law, P.C.

(57) ABSTRACT

A video image de-interlacing method is provided. The method-includes: acquiring a single frame of original video image; extracting odd field data and even field data in an original video image; performing N-1 times of down-sampling on the odd field data to obtain N-1 odd field data with different resolutions and performing N-1 times of down-sampling on the even field data to obtain N-1 even field data with different resolutions; combining odd field data and even field data with the same resolution to obtain a down-sampled image; and inputting the original video image and the down-sampled image to the de-interlacing network for de-interlacing.

20 Claims, 5 Drawing Sheets

(56) References Cited

U.S. PATENT DOCUMENTS

| | | |
|---|---|---|
| 2011/0254921 A1 | 10/2011 | Pahalawatta et al. |
| 2012/0033040 A1 | 2/2012 | Pahalawatta et al. |
| 2014/0063188 A1 | 3/2014 | Smirnov et al. |
| 2014/0112394 A1 | 4/2014 | Sullivan et al. |
| 2014/0321540 A1 | 10/2014 | Leontaris et al. |
| 2015/0256837 A1 | 9/2015 | Bar-On et al. |
| 2018/0020225 A1 | 1/2018 | Ye et al. |
| 2019/0088178 A1 | 3/2019 | Ward |

FOREIGN PATENT DOCUMENTS

| | | |
|---|---|---|
| CN | 102045531 A | 5/2011 |
| CN | 102450009 A | 5/2012 |
| CN | 102572360 A | 7/2012 |
| CN | 102665060 A | 9/2012 |
| CN | 103905769 A | 7/2014 |
| CN | 103999466 A | 8/2014 |
| CN | 104662896 A | 5/2015 |
| CN | 104704839 A | 6/2015 |
| CN | 104982036 A | 10/2015 |
| CN | 108111833 A | 6/2018 |
| CN | 109688360 A | 4/2019 |
| CN | 109714547 A | 5/2019 |
| CN | 110855903 A | 2/2020 |
| EP | 1931136 A1 | 6/2008 |
| KR | 20060077809 A | 7/2006 |

OTHER PUBLICATIONS

Zhu A. et al., "Method for super-resolution using parallel interlaced sampling", Journal of Shandong University (Engineering Science), vol. 50, No. 2, Apr. 2020.

Han R., "Research and Implementation of Frame Rate Up Conversion for High-Definition Video Applications", Doctoral Dissertation of Beijing University of Posts and Telecommunications, Jun. 2013.

* cited by examiner

VIDEO IMAGE DE-INTERLACING METHOD AND VIDEO IMAGE DE-INTERLACING DEVICE

CROSS-REFERENCE TO RELATED APPLICATION

This application is the U.S. national phase of PCT Application No. PCT/CN2021/078598 filed on Mar. 2, 2021, the disclosure of which is incorporated in its entirety by reference herein.

TECHNICAL FIELD

The embodiments of the present disclosure relate to the technical field of image processing, and more particularly relate to a video image de-interlacing method and a video image de-interlacing device.

BACKGROUND

In the related art, for a progressive scanning display device, if a received video image is an interlaced video image, the interlaced video image needs to be de-interlaced to obtain a progressive scanning video image. When de-interlacing interlaced video images, how to improve a de-interlacing effect is an urgent problem to be solved.

SUMMARY

In a first aspect, embodiments of the present disclosure provide a video image de-interlacing method which includes:

acquiring a single frame original video image including parity field information;

extracting odd field data and even field data in the original video image;

performing N-1 times of down-sampling on the odd field data to obtain N-1 odd field data with different resolutions, and performing N-1 times of down-sampling on the even field data to obtain N-1 even field data with different resolutions; combining odd field data and even field data with the same resolution in N-1 odd field data with different resolutions and N-1 even field data with different resolutions to obtain N-1 down-sampled images with different resolutions;

inputting an image with N resolutions which includes the original video image and the down-sampled image with N-1 resolutions into a de-interlacing network to perform de-interlacing processing so as to obtain a de-interlaced image in the image with N resolutions, the resolutions from the image with the $N^{th}$ resolution to the image with the first resolution increase gradually, the de-interlacing network includes N series-connected de-interlacing sub-networks, and the images processed by the N series-connected de-interlacing sub-networks are respectively generated based on the image with N resolutions, wherein N is a positive integer greater than or equal to 2.

Optionally, inputting the image with the N resolutions including the original video image and the down-sampled image with N-1 resolutions into the de-interlacing network to perform the de-interlacing processing so as to obtain the de-interlaced image includes:

splicing two down-sampled images with the $N^{th}$ resolution to obtain a spliced image with the $N^{th}$ resolution; inputting the $N^{th}$ resolution spliced image into an $N^{th}$ serial de-interleaved sub-network to obtain an $N^{th}$ resolution de-interleaved image; up-sampling the $N^{th}$ resolution de-interlaced image to obtain an N-$1^{th}$ resolution up-sampled image;

splicing an up-sampled image with an $i^{th}$ resolution and a down-sampled image with the $i^{th}$ resolution to obtain a spliced image with the $i^{th}$ resolution; inputting the spliced image with the $i^{th}$ resolution into an $i^{th}$ deinterleaving sub-network to obtain a de-interleaved image with the $i^{th}$ resolution; performing up-sampling processing on the de-interlaced image with the $i^{th}$ resolution to obtain an up-sampled image with an i-$1^{th}$ resolution; wherein i is an integer greater than or equal to 2 and less than N; and splicing an up-sampled image with a first resolution and an original video image with the first resolution to obtain a spliced image with the first resolution; inputting the first resolution spliced image into a first de-interlacing network to obtain a first resolution de-interlaced image as an output image of the de-interlacing network.

Optionally, combining the odd field data and the even field data with the same resolution among the odd field data with N-1 different resolutions and the even field data with N-1 different resolutions includes:

arranging the odd field data and the even field data having the same resolution in line intervals.

Optionally, the N is 3 or 4.

Optionally, the resolutions of adjacent images with the N resolutions have a relationship of 2 times.

Optionally, a bi-cubic interpolation method is used for up-sampling and/or down-sampling.

Optionally, N series-connected de-interlacing sub-networks have the same structure and different parameters.

Optionally, each of the de-interlacing sub-networks includes a plurality of series-connected filters, each filter includes a plurality of series-connected convolution kernels, each two of the plurality of series-connected filters have the same resolution, and the output of each filter except for the last filter serves as the input of the next filter and the filter with the same resolution.

Optionally, the method further includes:

training the de-interleaving network to be trained to obtain the de-interleaving network, wherein the training of the de-interleaving network to be trained includes:

acquiring a single frame training video image containing parity field information;

extracting odd field data and even field data for training in the video image for training;

performing N-1 times of down-sampling on the training odd field data to obtain N-1 odd field data with different resolutions, and performing N-1 times of down-sampling on the training even field data to obtain N-1 even field data with different resolutions; combining the odd field data and the even field data with the same resolution in N-1 odd field data with different resolutions and N-1 even field data with different resolutions to obtain N-1 down-sampled images for training with different resolutions;

inputting a training image with N resolutions containing the video image for training and the down-sampled image for training with N-1 resolutions into the de-interlacing network to be trained to perform de-interlacing processing so as to obtain output images with N resolutions, wherein in the images with N resolutions, the resolutions from the image with the $N^{th}$ resolution to the image with the first resolution increase gradually, the de-interlacing network to be trained includes N series-connected de-interlacing sub-networks, and the images processed by the N series-connected de-interlacing sub-networks are respectively generated based on the images with the N resolutions; and calculating the loss of the N resolution output images, calculating the total loss of the de-interlacing network to be trained according to the loss of the N resolution output images, and optimizing the parameters of the de-interlacing network to be trained according to the total loss to obtain the trained de-interlacing network.

Optionally, the loss is an L2 loss.

Optionally, the total loss is equal to the sum of the losses of the output images with the N resolutions or a weighted sum of the losses of the output images with the N resolutions.

In a second aspect, embodiments of the present disclosure provide a video image de-interlacing device which includes:

a first acquisition module, which is adapted for acquiring a single frame original video image including parity field information;

a first extraction module, which is adapted for extracting odd field data and even field data in the original video image;

a first down-sampling module, which is adapted for performing N-1 times of down-sampling on the odd field data to obtain N-1 odd field data with different resolutions, and performing N-1 times of down-sampling on the even field data to obtain N-1 even field data with different resolutions; combining odd field data and even field data with the same resolution in N-1 odd field data with different resolutions and N-1 even field data with different resolutions to obtain N-1 down-sampled images with different resolutions; and a de-interlacing module, which is adapted for inputting an image with N resolutions comprising the original video image and the down-sampled image with N-1 resolutions into a de-interlacing network to perform de-interlacing processing so as to obtain a de-interlaced image in the image with N resolutions, the resolutions from the image with the $N^{th}$ resolution to the image with the first resolution increase gradually, the de-interlacing network comprises N series-connected de-interlacing sub-networks, and the images processed by the N series-connected de-interlacing sub-networks are respectively generated based on the image with N resolutions, wherein N is a positive integer greater than or equal to 2.

In a third aspect, embodiments of the present disclosure provide an electronic device including a processor, a memory, and a program or instructions stored on the memory and executable on the processor, which when executed by the processor performs the steps of the video image de-interlacing method of the above first aspect.

In a fourth aspect, embodiments of the present disclosure provide a non-transitory computer-readable storage medium having stored thereon a program or instructions which, when executed by a processor, performs the steps of the video image de-interlacing method in the first aspect.

DETAILED DESCRIPTION

The technical solution of embodiments of the present disclosure will now be described more fully hereinafter with reference to the accompanying drawings, in which some, but not all embodiments of the disclosure are shown. Based on the embodiments of the present disclosure, all other embodiments obtained by a person of ordinary skill in the art without inventive effort fall within the scope of protection of this disclosure.

Figure 1:
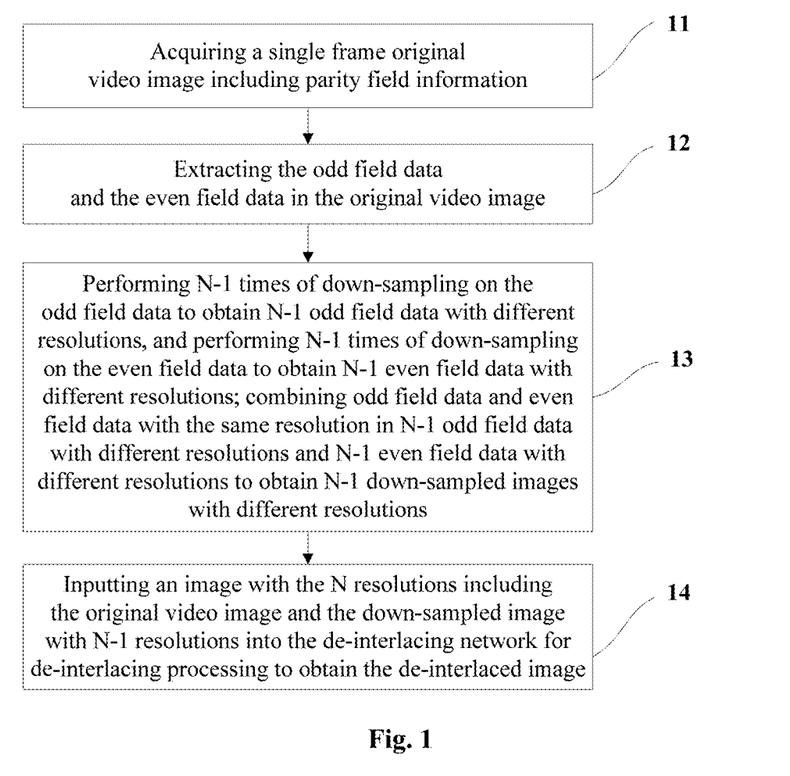
FIG. 1 is a schematic flow diagram of a video image de-interlacing method according to an embodiment of the present disclosure.

With reference to FIG. 1, the embodiments of the present disclosure provide a video image de-interlacing method, which includes:

Step 11: acquiring a single frame original video image including parity field information.

Here, the original video image is a video image obtained by an interlacing scanning means, wherein the electron beam first scans all the odd lines from left to right and from top to bottom to form one field of image data, and then the electron beam returns to the top and scans all the even lines from left to right and from top to bottom to form another field of image data. The scan fields displayed by the two orthogonal directions are exchanged to form each complete video image for each frame.

Step 12: extracting the odd field data and the even field data in the original video imag.

Figure 2:
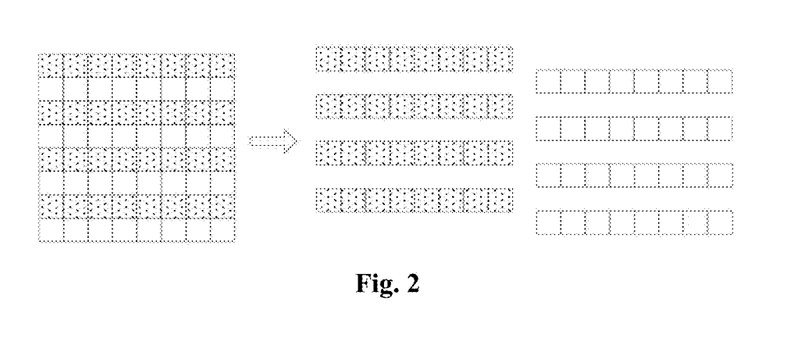
FIG. 2 is a schematic diagram of extracting odd field data and even field data from an original video image according to an embodiment of the present disclosure.

Referring to FIG. 2, wherein FIG. 2 is a schematic diagram of extracting the odd field data and the even field data from the original video image according to an embodiment of the present disclosure.

Step 13: performing N-1 times of down-sampling on the odd field data to obtain N-1 odd field data with different resolutions, and performing N-1 times of down-sampling on the even field data to obtain N-1 even field data with different resolutions; combining odd field data and even field data with the same resolution in N-1 odd field data with different resolutions and N-1 even field data with different resolutions to obtain N-1 down-sampled images with different resolutions.

For example, the odd field data and the even field data of the original video image are respectively down-sampled twice. Please refer to FIGS. 3 and 4, and the down-sampling times are respectively 2 times and 4 times. Assuming that the resolutions of the odd field data and the even field data are both 256×256, down-sampling twice results in the odd field data and the even field data with a resolution of 128×128, and down-sampling 4 times results in the odd field data and the even field data with a resolution of 64×64.

In the disclosed embodiment, the odd field data and the even field data after down-sampling can be combined in a concatenation manner of the odd field data and the even field data in the original video image.

Figure 3:
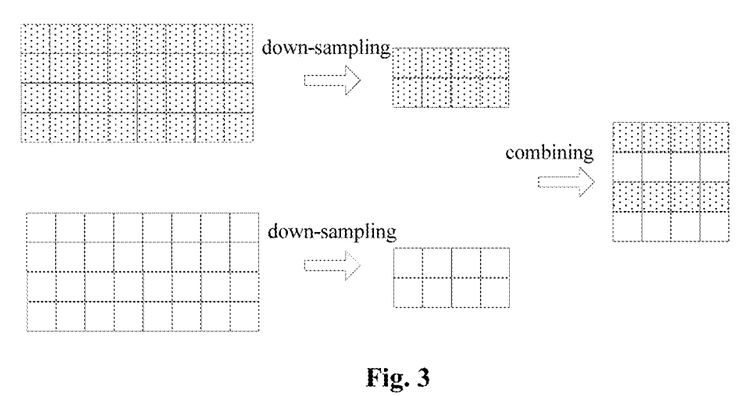
FIGS. 3 and 4 are schematic diagrams of a method for down-sampling an image according to an embodiment of the present disclosure.
Figure 4:
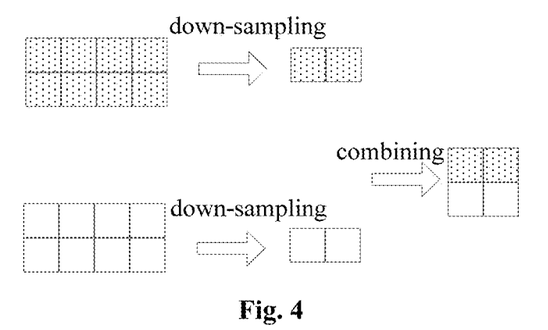

Optionally, referring to FIGS. 3 and 4, arranging the odd field data and the even field data having the same resolution in line intervals, i.e., interlacing and combining.

Step 14: inputting an image with the N resolutions including the original video image and the down-sampled image with N-1 resolutions into the de-interlacing network for de-interlacing processing to obtain the de-interlaced image, wherein in the image with N resolutions, the resolutions from the image with the $N^{th}$ resolution to the image with the first resolution increase gradually, the de-interlacing network includes N series de-interlacing sub-networks, and the images processed by the N series de-interlacing sub-networks are respectively generated based on the image with N resolutions.

Specifically, N is a positive integer greater than or equal to 2.

In the embodiment of the present disclosure, the N de-interlacing networks are used for processing images with one of the N resolutions.

In the embodiment of the present disclosure, a final output de-interlaced image from the de-interlacing network is a progressive scanning video image.

In the embodiment of the present disclosure, down-sampling the extracted odd field data and the even field data of the original video image to the plurality of resolutions and performing de-interlacing at the plurality of resolutions can ensure that the information about the original video image is not destroyed when down-sampling, and performing progressive de-interlacing can achieve a better de-interlacing effect.

The operation of the de-interlacing network of embodiments of the present disclosure is described below.

In an embodiment of the present disclosure, optionally, inputting the image with the N resolutions including the original video image and the down-sampled image with N-1 resolutions into the de-interlacing network to perform the de-interlacing processing so as to obtain the de-interlaced image includes:

performing the following steps on the minimum resolution image: splicing two down-sampled images with the $N^{th}$ resolution to obtain a spliced image with the $N^{th}$ resolution; inputting the $N^{th}$ resolution spliced image into an $N^{th}$ serial de-interleaved sub-network to obtain an $N^{th}$ resolution de-interleaved image; up-sampling the $N^{th}$ resolution de-interlaced image to obtain an $N-1^{th}$ resolution up-sampled image;

performing the following steps on images with intermediate resolution: splicing an up-sampled image with an $i^{th}$ resolution and a down-sampled image with the $i^{th}$ resolution to obtain a spliced image with the $i^{th}$ resolution; inputting the spliced image with the $i^{th}$ resolution into an $i^{th}$ de-interleaving sub-network to obtain a de-interleaved image with the $i^{th}$ resolution; performing up-sampling processing on the de-interlaced image with the $i^{th}$ resolution to obtain an up-sampled image with an $i-1^{th}$ resolution; wherein i is an integer greater than or equal to 2 and less than N; and performing the following steps on the maximum resolution image: splicing an up-sampled image with a first resolution and an original video image with the first resolution to obtain a spliced image with the first resolution; inputting the first resolution spliced image into a first de-interlacing network to obtain a first resolution de-interlaced image as an output image of the de-interlacing network.

In the embodiments of the present disclosure, when de-interleaving is performed on the video image, starting from a low resolution, continuously increasing the resolution and performing progressive de-interleaving so as to achieve a better de-interleaving effect, and since odd field data and even field data of an extracted original video image are respectively down-sampled during down-sampling, it can be ensured that information about the original video image is not destroyed during down-sampling.

In the embodiment of the present disclosure, optionally, the N is 3 or 4, so as to achieve the better de-interlacing effect and effectively reduce the implementation cost. Of course, other values of N greater than or equal to 2 are not excluded.

In the embodiment of the present disclosure, optionally, the resolutions of adjacent resolution images in the N resolution images are in a 2 times relationship, for example, the resolutions of the N resolution images are 256×256, 128×128 and 64×64 respectively.

In the embodiment of the present disclosure, optionally, the bi-cubic interpolation method is used for up-sampling and/or down-sampling to preserve better image details. Of course, other interpolation methods may be used for up-sampling and/or down-sampling, such as bilinear interpolation, etc.

Figure 5:
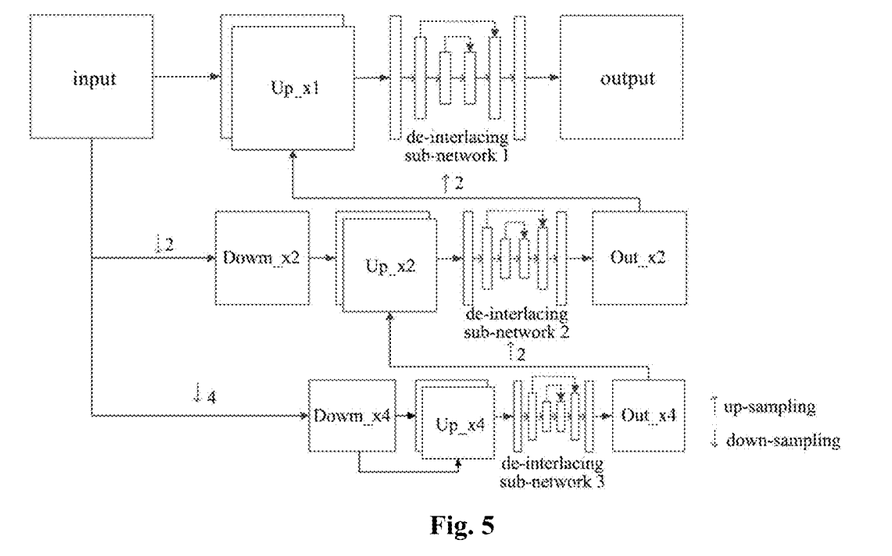
FIG. 5 is a schematic diagram of a de-interlacing network according to an embodiment of the present disclosure.

With reference to FIG. 5, FIG. 5 is a schematic diagram of the de-interlacing network according to the embodiment of the present disclosure, wherein the de-interlacing network includes three de-interlacing sub-networks: a de-interlacing sub-network 1, a de-interlacing sub-network 2, and a de-interlacing sub-network 3.

The working process of a de-interlacing network is as follows:

1) extracting the odd field data and the even field data in the original video image;

2) down-sampling the odd field data and the even field data of the original video image twice, respectively 2 times and 4 times, so as to obtain down-sampled images, $Down\_x2_{odd}$, $Down\_x2_{even}$, $Down\_x4_{odd}$, and $Down\_x4_{even}$, of the odd field data and the even field data, and combining the $Down\_x2_{odd}$ and $Down\_x2_{even}$ to obtain the Down_x2, and combining the $Down\_x4_{odd}$ and $Down\_x4_{even}$ to obtain the Down_x4;

3) splicing the two Down_x4 to obtain a spliced image, and inputting the spliced image into a de-interlacing sub-network 3 to perform de-interlacing processing to obtain a de-interlaced image;

4) up-sampling the de-interlaced image out_x4 by 2 times to obtain Up_x2, splicing the Up_x2 and Down_x2 to obtain a spliced image, and inputting the spliced image into a de-interlacing sub-network 2 to perform de-interlacing processing to obtain a de-interlaced imageout_x2; and 5) up-sampling the de-interlaced image out_x2 by 2 times to obtain Up_x1, and splicing the Up_xland the original vedio image to obtain a splicing image, and inputting the splicing image into the de-interlacing sub-network 1 to perform de-interlacing processing to obtain a final output.

In the embodiment of the present disclosure, optionally, the N concatenated de-interlacing sub-networks have the same structure and different parameters.

Figure 6:
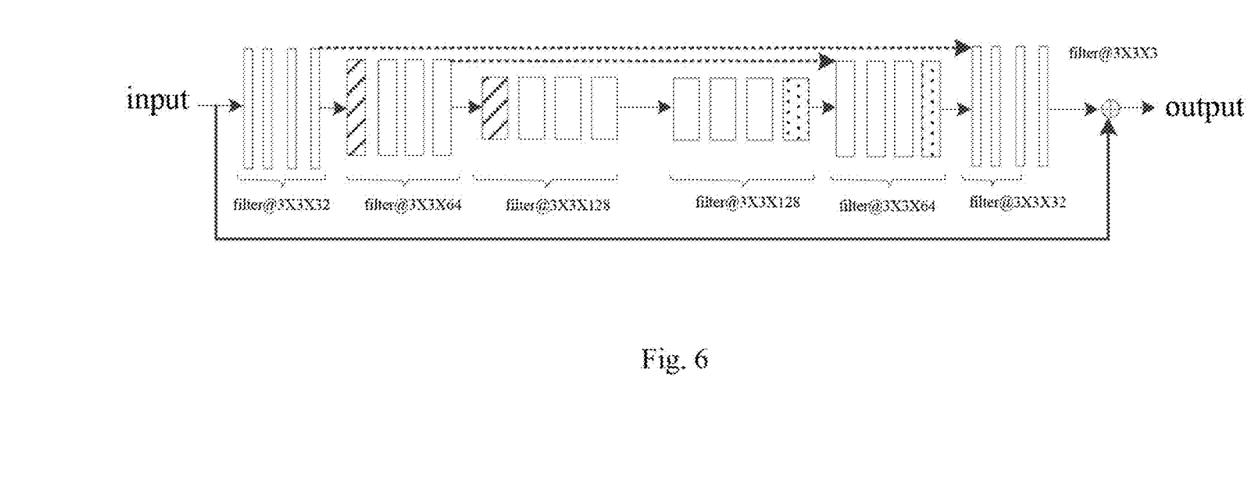
FIG. 6 is a schematic structural diagram of a de-interlacing sub-network according to an embodiment of the present disclosure.

With reference to FIG. 6, FIG. 6 is a schematic structural diagram of the de-interlacing sub-network according to the embodiment of the present disclosure, and the de-interlacing sub-network includes: a plurality of filters connected in series and each filter includes a plurality of convolution kernels connected in series (vertical bars in FIG. 6). In the embodiment shown in FIG. 6, each filter includes four convolution kernels in series, although in other embodiments of the present disclosure, the number of convolution kernels in the filter is not limited to four. In the embodiment shown in FIG. 6, the vertical bars filled with twill indicate down-sampling and the vertical bars filled with dots indicate up-sampling. In the embodiment of the present disclosure, each of the de-interlacing sub-networks includes a plurality of series-connected filters, each filter includes a plurality of series-connected convolution kernels, each two of the plurality of series-connected filters have the same resolution, and the output of each filter except for the last filter serves as the input of the next filter and the filter with the same resolution. In the embodiment shown in FIG. 6, the de-interlacing sub-network includes six filters connected in series, wherein the resolution of the first filter is the same as that of the sixth filter, the resolution of the second filter is the same as that of the fifth filter, the resolution of the third filter is the same as that of the fourth filter, the output of the first filter serves as the input of the second filter and the sixth filter (with the same resolution as that of the first filter), and the output of the second filter serves as the input of the third filter and the fifth filter (with the same resolution as that of the second filter), the output of the third filter serves as the input to the fourth filter (with the same resolution as that of the third filter).

Figure 7:
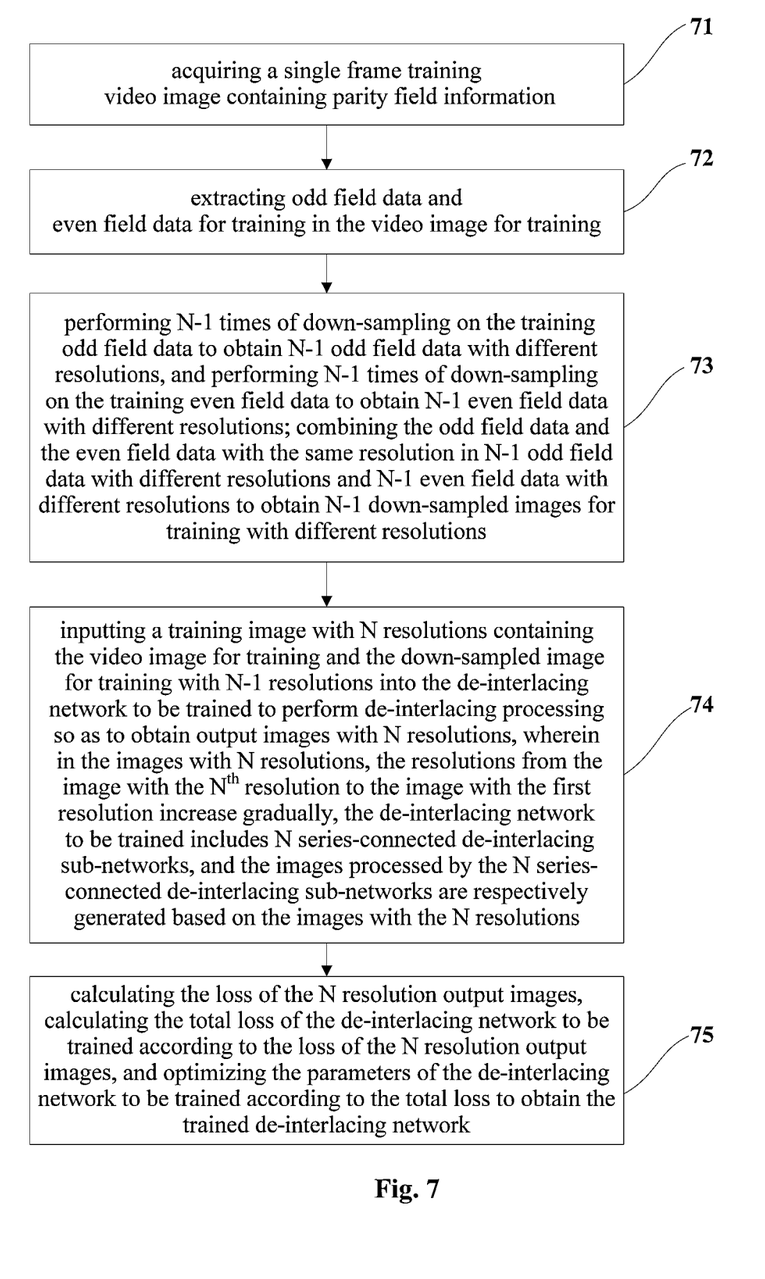
FIG. 7 is a flow diagram of a de-interlacing network training method according to an embodiment of the present disclosure.

In the embodiment of the present disclosure, optionally, the video image de-interlacing method further includes: training the de-interleaving network to be trained to obtain the de-interleaving network. With reference to FIG. 7, training the de-interleaved network to be trained includes:

Step 71: acquiring a single frame training video image containing parity field information;

Step 72: extracting odd field data and even field data for training in the video image for training;

Step 73: performing N-1 times of down-sampling on the training odd field data to obtain N-1 odd field data with different resolutions, and performing N-1 times of down-sampling on the training even field data to obtain N-1 even field data with different resolutions; combining the odd field data and the even field data with the same resolution in N-1 odd field data with different resolutions and N-1 even field data with different resolutions to obtain N-1 down-sampled images for training with different resolutions;

Step 74: inputting a training image with N resolutions containing the video image for training and the down-sampled image for training with N-1 resolutions into the de-interlacing network to be trained to perform de-interlacing processing so as to obtain output images with N resolutions, wherein in the images with N resolutions, the resolutions from the image with the $N^{th}$ resolution to the image with the first resolution increase gradually, the de-interlacing network to be trained includes N series-connected de-interlacing sub-networks, and the images processed by the N series-connected de-interlacing sub-networks are respectively generated based on the images with the N resolutions; and Step 75: calculating the loss of the N resolution output images, calculating the total loss of the de-interlacing network to be trained according to the loss of the N resolution output images, and optimizing the parameters of the de-interlacing network to be trained according to the total loss to obtain the trained de-interlacing network.

In the embodiment of the present disclosure, optionally, the loss is an L2 loss. Of course, other types of losses are possible.

In the embodiment of the present disclosure, optionally, the total loss is equal to the sum of the losses of the output images with the N resolutions to a weighted sum of the losses of the N resolution output images. The loss of each output image is obtained based on the output image and the corresponding true value image of the output image.

Figure 8:
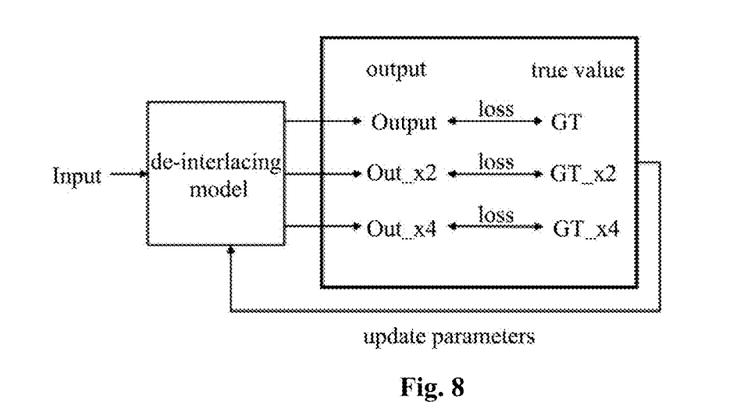
FIG. 8 is a schematic diagram of a method for calculating the total loss of a de-interlacing network according to an embodiment of the present disclosure.

Taking the training of the de-interlacing network in FIG. 5 as an example, referring to FIG. 8, the total loss of the de-interlacing network is equal to the sum of the losses of the output images Output, out_x2, and Out_x4 of the three de-interlacing sub-networks, or is equal to the weighted sum of the losses of the output images Output, out_x2, and Out_x4 of the three de-interlacing sub-networks, the sum of the total losses is calculated, and the parameters of the de-interlacing network are updated according to the calculated total losses.

Figure 9:
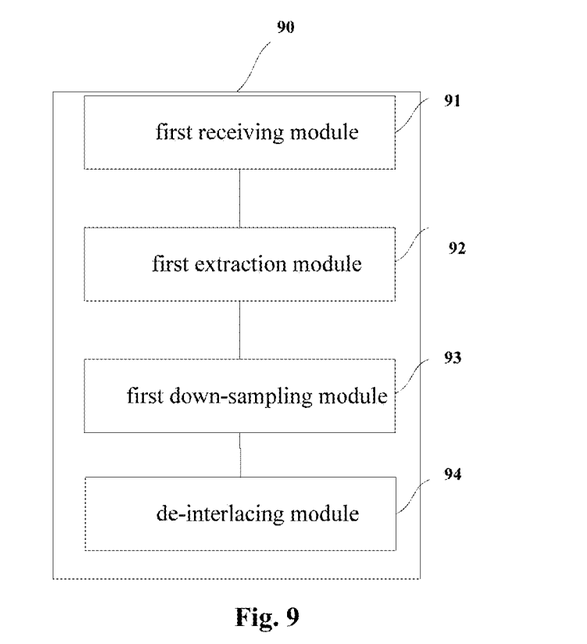
FIG. 9 is a schematic structural diagram of a video image de-interlacing device according to an embodiment of the present disclosure.

With reference to FIG. 9, the embodiment of the present disclosure also provides the video image de-interlacing device 90, which includes:

a first acquisition module 91, which is adapted for acquiring a single frame of original video image containing parity field information;

a first extraction module 92, which is adapted for extracting the odd field data and the even field data in the original video image;

a first down-sampling module 93, which is adapted for performing N-1 times of down-sampling on the odd field data to obtain N-1 odd field data with different resolutions, and performing N-1 times of down-sampling on the even field data to obtain N-1 even field data with different resolutions; combining odd field data and even field data with the same resolution in N-1 odd field data with different resolutions and N-1 even field data with different resolutions to obtain N-1 down-sampled images with different resolutions; and a de-interlacing module 94, which is adapted for inputting an image with N resolutions including the original video image and the down-sampled image with N-1 resolutions into the de-interlacing network for de-interlacing processing to obtain a de-interlaced image, wherein in the image with N resolutions, the resolutions from the image with the $N^{th}$ resolution to the image with the first resolution increase gradually, the de-interlacing network includes N series-connected de-interlacing sub-networks, and the images processed by the N series-connected de-interlacing sub-networks are respectively generated based on the image with N resolutions.

Specifically, N is a positive integer greater than or equal to 2.

In the embodiment of the present disclosure, down-sampling the extracted odd field data and the even field data of the original video image to the plurality of resolutions and performing de-interlacing at the plurality of resolutions can ensure that the information about the original video image is not destroyed when down-sampling, and performing progressive de-interlacing can achieve the better de-interlacing effect.

In the embodiment of the present disclosure, optionally, the de-interlacing module 94 includes:

a first de-interlacing sub-module, which is adapted for splicing two down-sampled images with the $N^{th}$ resolution; inputting the $N^{th}$ resolution spliced image into an $N^{th}$ serial de-interleaved sub-network to obtain an $N^{th}$ resolution de-interleaved image; up-sampling the $N^{th}$ resolution de-interlaced image to obtain an $N-1^{th}$ resolution up-sampled image;

a second de-interlacing sub-module, which is adapted for splicing the up-sampled image with the $i^{th}$ resolution and a down-sampled image of the $i^{th}$ resolution to obtain a spliced image of the $i^{th}$ resolution; inputting the spliced image of the $i^{th}$ resolution into an $i^{th}$ deinterleaving sub-network to obtain a de-interleaved image of the $i^{th}$ resolution; performing up-sampling processing on the de-interlaced image of the $i^{th}$ resolution to obtain an up-sampled image with an $i\text{-}1^{th}$ resolution, wherein i is an integer greater than or equal to 2 and less than N; and a third de-interlacing sub-module, which is adapted for splicing an up-sampled image with a first resolution and an original video image with the first resolution to obtain a spliced image with the first resolution; inputting the first resolution stitched image into a first de-interlacing network to obtain a first resolution de-interlaced image as an output image of the de-interlacing network.

In the embodiments of the present disclosure, optionally, the N is 3 or 4.

In the embodiments of the present disclosure, optionally, the resolutions of images of adjacent resolutions in the N resolution images are in a 2 times relationship.

In the embodiments of the present disclosure, up-sampling and/or down-sampling is optionally performed by using a bicubic interpolation method.

In the embodiment of the present disclosure, optionally, the N concatenated de-interlacing sub-networks have the same structure and different parameters.

In the embodiments of the present disclosure, optionally, each of the de-interlacing sub-networks includes a plurality of series-connected filters, each filter includes a plurality of series-connected convolution kernels, each two of the plurality of series-connected filters have the same resolution, and the output of each filter except for the last filter serves as the input of the next filter and the filter with the same resolution.

In an embodiment of the present disclosure, optionally, the video image de-interleaving device further includes:

a training module, which is adapted for training the de-interleaving network to be trained to obtain the de-interleaving network, wherein the training of the de-interleaving network to be trained includes:

acquiring a single frame training video image containing parity field information;

extracting odd field data and even field data for training in the video image for training;

performing N-1 times of down-sampling on the training odd field data to obtain N-1 odd field data with different resolutions, and performing N-1 times of down-sampling on the training even field data to obtain N-1 even field data with different resolutions; combining the odd field data and the even field data with the same resolution in N-1 odd field data with different resolutions and N-1 even field data with different resolutions to obtain N-1 down-sampled images for training with different resolutions;

inputting a training image with N resolutions containing the video image for training and the down-sampled image for training with N-1 resolutions into the de-interlacing network to be trained to perform de-interlacing processing so as to obtain output images with N resolutions, wherein in the images with N resolutions, the resolutions from the image with the $N^{th}$ resolution to the image with the first resolution increase gradually, the de-interlacing network to be trained includes N series-connected de-interlacing sub-networks, and the images processed by the N series-connected de-interlacing sub-networks are respectively generated based on the images with the N resolutions; and calculating the loss of the N resolution output images, calculating the total loss of the de-interlacing network to be trained according to the loss of the N resolution output images, and optimizing the parameters of the de-interlacing network to be trained according to the total loss to obtain the trained de-interlacing network.

In the embodiment of the present disclosure, optionally, the loss is an L2 loss.

In the embodiment of the present disclosure, optionally, the total loss is equal to the sum of the losses of the output images with the N resolutions to a weighted sum of the losses of the N resolution output images.

Figure 10:
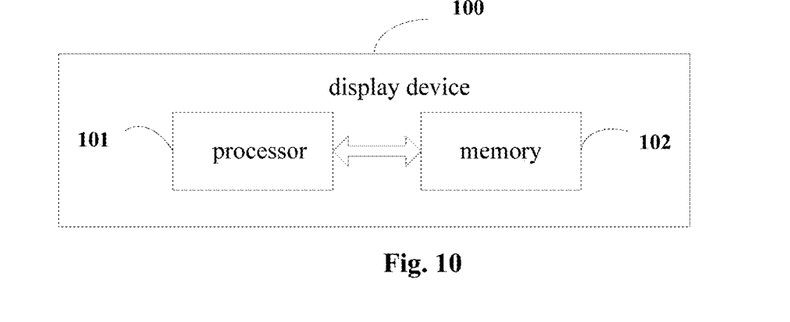
FIG. 10 is a schematic structural diagram of an electronic device according to an embodiment of the present disclosure.

As shown in FIG. 10, the embodiment of the present application also provides an electronic device 100 which includes a processor 101, a memory 102, and a program or instruction stored in the memory 102 and operable on the processor 101, which program or instruction, when executed by the processor 101, implements the various processes of the above-mentioned embodiment of the video image de-interlacing method, and can achieve the same technical effect, and in order to avoid repetition, the description thereof will not be repeated.

The embodiments of the present disclosure provide a non-volatile computer-readable storage medium having stored thereon a program or instructions which, when executed by a processor, performs the steps of the video image de-interlacing method. Each step of the video image de-interlacing method in above-mentioned embodiments is completed, when the program or instructions are executed by the processor, the same technical effects can be achieved, and in order to avoid repetition, the description thereof will not be repeated.

Specifically the processor is a processor in the terminal described in the above-mentioned embodiment. The non-volatile computer-readable storage medium is a computer read-only Memory (ROM), a Random Access Memory (RAM), a magnetic or optical disk, etc.

The embodiments of the present disclosure have been described above with reference to the accompanying drawings, but the present disclosure is not limited to the above-described embodiments, which are merely illustrative and not restrictive, and those skilled in the art, in light of the present disclosure, can make various changes in form and detail without departing from the spirit and scope of the present disclosure.

What is claimed is:

1. A video image de-interlacing method, comprising:

acquiring a single frame original video image including parity field information;

extracting odd field data and even field data in the original video image;

performing N-1 times of down-sampling on the odd field data to obtain N-1 odd field data with different resolutions, and performing N-1 times of down-sampling on the even field data to obtain N-1 even field data with different resolutions; combining odd field data and even field data with the same resolution in N-1 odd field data with different resolutions and N-1 even field data with different resolutions to obtain N-1 down-sampled images with different resolutions; and inputting an image with N resolutions which comprises the original video image and the down-sampled image with N-1 resolutions into a de-interlacing network to perform de-interlacing processing so as to obtain a de-interlaced image in the image with N resolutions, the resolutions from the image with an $N^{th}$ resolution to the image with a first resolution increase gradually, the de-interlacing network comprises N series-connected de-interlacing sub-networks, and the images processed by the N series-connected de-interlacing sub-networks are respectively generated based on the image with N resolutions, wherein N is a positive integer greater than or equal to 2.

2. The method according to claim 1, wherein inputting the image with the N resolutions comprising the original video image and the down-sampled image with N-1 resolutions into the de-interlacing network to perform the de-interlacing processing so as to obtain the de-interlaced image comprises:

splicing two down-sampled images with the $N^{th}$ resolution to obtain a spliced image with the $N^{th}$ resolution; inputting the $N^{th}$ resolution spliced image into an $N^{th}$ serial de-interleaved sub-network to obtain an $N^{th}$ resolution de-interleaved image; up-sampling an $N^{th}$ resolution de-interlaced image to obtain an $N-1^{th}$ resolution up-sampled image;

splicing an up-sampled image with an $i^{th}$ resolution and a down-sampled image with the $i^{th}$ resolution to obtain a spliced image with the $i^{th}$ resolution; inputting the spliced image with the $i^{th}$ resolution into an $i^{th}$ deinterleaving sub-network to obtain a de-interleaved image with the $i^{th}$ resolution; performing up-sampling processing on the de-interlaced image with the $i^{th}$ resolution to obtain an up-sampled image with an $i-1^{th}$ resolution; wherein i is an integer greater than or equal to 2 and less than N; and splicing an up-sampled image with a first resolution and an original video image with the first resolution to obtain a spliced image with the first resolution; inputting the first resolution spliced image into a first de-interlacing network to obtain a first resolution de-interlaced image as an output image of the de-interlacing network.

3. The method according to claim 2, wherein a bi-cubic interpolation method is adopted for up-sampling and/or down-sampling.

4. The method according to claim 2, wherein combining the odd field data and the even field data with the same resolution among the odd field data with N-1 different resolutions and the even field data with N-1 different resolutions comprises:

arranging the odd field data and the even field data having the same resolution in line intervals.

5. The method according to claim 2, wherein N is 3 or 4.

6. The method according to claim 2, wherein the resolutions of adjacent images with the N resolutions have a relationship of 2 times.

7. The method according to claim 2, wherein the N series-connected de-interlacing sub-networks have the same structure and different parameters.

8. The method according to claim 2, wherein a respective one of the de-interlacing sub-networks comprises a plurality of series-connected filters, a respective filter comprises a plurality of series-connected convolution kernels, respective two series-connected filters of the plurality of series-connected filters have the same resolution, and the output of the respective filter except for the last filter serves as the input of the next filter and the filter with the same resolution.

9. The method according to claim 1, wherein combining the odd field data and the even field data with the same resolution among the odd field data with N-1 different resolutions and the even field data with N-1 different resolutions comprises:

arranging the odd field data and the even field data having the same resolution in line intervals.

10. The method according to claim 1, wherein N is 3 or 4.

11. The method according to claim 1, wherein the resolutions of adjacent images with the N resolutions have a relationship of 2 times.

12. The method according to claim 1, wherein the N series-connected de-interlacing sub-networks have the same structure and different parameters.

13. The method according to claim 1, wherein a respective one of the de-interlacing sub-networks comprises a plurality of series-connected filters, a respective filter comprises a plurality of series-connected convolution kernels, respective two series-connected filters of the plurality of series-connected filters have the same resolution, and an output of the respective filter except for the last filter serves as the input of the next filter and the filter with the same resolution.

14. The method according to claim 1, further comprising:

training a de-interleaving network to be trained to obtain the de-interleaving network, wherein the training of the de-interleaving network to be trained comprises:

acquiring a single frame training video image containing parity field information;

extracting odd field data and even field data for training in the video image for training;

performing N-1 times of down-sampling on the training odd field data to obtain N-1 odd field data with different resolutions, and performing N-1 times of down-sampling on the training even field data to obtain N-1 even field data with different resolutions; combining the odd field data and the even field data with the same resolution in N-1 odd field data with different resolutions and N-1 even field data with different resolutions to obtain N-1 down-sampled images for training with different resolutions;

inputting a training image with N resolutions containing the video image for training and the down-sampled image for training with N-1 resolutions into the de-interlacing network to be trained to perform de-interlacing processing so as to obtain output images with N resolutions, wherein in the images with N resolutions, the resolutions from the image with the $N^{th}$ resolution to the image with the first resolution increase gradually, the de-interlacing network to be trained includes N series-connected de-interlacing sub-networks, and the images processed by the N series-connected de-interlacing sub-networks are respectively generated based on the images with the N resolutions; and calculating a loss of the N resolution output images, calculating a total loss of the de-interlacing network to be trained according to the loss of the N resolution output images, and optimizing parameters of the de-interlacing network to be trained according to the total loss to obtain the trained de-interlacing network.

15. The method according to claim 14, wherein the loss is an L2 loss.

16. The method according to claim 14, wherein the total loss is equal to a sum of the losses of the output images with the N resolutions or a weighted sum of the losses of the output images with the N resolutions.

17. An electronic device, comprising a processor, a memory, and a program or instructions stored on the memory and executable on the processor, when the program or instructions are executed by the processor, a video image de-interlacing method is realized, the method comprising:

acquiring a single frame original video image including parity field information;

extracting odd field data and even field data in the original video image;

performing N-1 times of down-sampling on the odd field data to obtain N-1 odd field data with different resolutions, and performing N-1 times of down-sampling on the even field data to obtain N-1 even field data with different resolutions; combining odd field data and even field data with the same resolution in N-1 odd field data with different resolutions and N-1 even field data with different resolutions to obtain N-1 down-sampled images with different resolutions; and inputting an image with N resolutions which comprises the original video image and the down-sampled image with N-1 resolutions into a de-interlacing network to perform de-interlacing processing so as to obtain a de-interlaced image in the image with N resolutions, the resolutions from the image with an $N^{th}$ resolution to the image with a first resolution increase gradually, the de-interlacing network comprises N series-connected de-interlacing sub-networks, and the images processed by the N series-connected de-interlacing sub-networks are respectively generated based on the image with N resolutions, wherein N is a positive integer greater than or equal to 2.

18. The electronic device according to claim 17, wherein inputting the image with the N resolutions comprising the original video image and the down-sampled image with N-1 resolutions into the de-interlacing network to perform the de-interlacing processing so as to obtain the de-interlaced image comprises:

splicing two down-sampled images with an $N^{th}$ resolution to obtain a spliced image with the $N^{th}$ resolution; inputting the $N^{th}$ resolution spliced image into an $N^{th}$ serial de-interleaved sub-network to obtain an $N^{th}$ resolution de-interleaved image; up-sampling an $N^{th}$ resolution de-interlaced image to obtain an $N-1^{th}$ resolution up-sampled image;

splicing an up-sampled image with an $i^{th}$ resolution and a down-sampled image with the $i^{th}$ resolution to obtain a spliced image with the $i^{th}$ resolution; inputting the spliced image with the $i^{th}$ resolution into an $i^{th}$ deinterleaving sub-network to obtain a de-interleaved image with the $i^{th}$ resolution; performing up-sampling processing on the de-interlaced image with the $i^{th}$ resolution to obtain an up-sampled image with an $i-1^{th}$ resolution; wherein i is an integer greater than or equal to 2 and less than N; and splicing an up-sampled image with a first resolution and an original video image with the first resolution to obtain a spliced image with the first resolution; inputting the first resolution spliced image into a first de-interlacing network to obtain a first resolution de-interlaced image as an output image of the de-interlacing network.

19. The electronic device according to claim 17, wherein combining the odd field data and the even field data with the same resolution among the odd field data with N-1 different resolutions and the even field data with N-1 different resolutions comprises:

arranging the odd field data and the even field data having the same resolution in line intervals.

20. A non-transitory computer-readable storage medium, wherein the non-transitory computer-readable storage medium storing program or instructions, when the program or the instructions are executed by one or more processors, a video image de-interlacing method is realized, the method comprising:

acquiring a single frame original video image including parity field information;

extracting odd field data and even field data in the original video image;

performing N-1 times of down-sampling on the odd field data to obtain N-1 odd field data with different resolutions, and performing N-1 times of down-sampling on the even field data to obtain N-1 even field data with different resolutions; combining odd field data and even field data with the same resolution in N-1 odd field data with different resolutions and N-1 even field data with different resolutions to obtain N-1 down-sampled images with different resolutions; and inputting an image with N resolutions which comprises the original video image and the down-sampled image with N-1 resolutions into a de-interlacing network to perform de-interlacing processing so as to obtain a de-interlaced image in the image with N resolutions, the resolutions from the image with an $N^{th}$ resolution to the image with a first resolution increase gradually, the de-interlacing network comprises N series-connected de-interlacing sub-networks, and the images processed by the N series-connected de-interlacing sub-networks are respectively generated based on the image with N resolutions, wherein N is a positive integer greater than or equal to 2.

* * * * *